United States Patent [19]

Keightley

[11] Patent Number: 4,974,959
[45] Date of Patent: Dec. 4, 1990

[54] SLIDE PROJECTOR

[75] Inventor: John H. Keightley, Richmond, Canada

[73] Assignee: Production Arts Lighting Inc., New York, N.Y.

[21] Appl. No.: 434,002

[22] Filed: Nov. 9, 1989

[51] Int. Cl.$^5$ ............................................. G03B 23/04
[52] U.S. Cl. .................................. 353/118; 353/116; 353/114
[58] Field of Search ............... 353/118, 116, 114, 117

[56] References Cited

U.S. PATENT DOCUMENTS

| | | | |
|---|---|---|---|
| 3,123,925 | 3/1964 | Johnson | 353/116 |
| 3,652,155 | 3/1972 | Scheibel | 353/118 |
| 3,711,195 | 1/1973 | Gehlert et al. | 353/116 |
| 3,847,473 | 11/1974 | Sobotta | 353/114 |
| 3,914,039 | 10/1975 | Bennett et al. | 353/114 |
| 4,015,900 | 4/1977 | Wells | 353/116 |
| 4,199,234 | 4/1980 | Meyer | 353/118 |
| 4,379,627 | 4/1983 | Naäl | 353/114 |
| 4,382,663 | 5/1983 | Neudecker | 353/116 |

FOREIGN PATENT DOCUMENTS 1802546  5/1970  Fed. Rep. of Germany ...... 353/116

Primary Examiner—William A. Cuchlinski, Jr.
Assistant Examiner—William C. Dowling
Attorney, Agent, or Firm—Shlesinger & Myers

[57] ABSTRACT

A slide projector having a projector frame and a light source and lens assembly mounted on the frame which includes a cassette having a plurality of slide frame receptacles for receiving slide frames therein. The cassette is movable so as to bring selected slide frames into a dispensing position. A frame grabber mounted on the projector frame is movable in a direction perpendicular to the lens axis from a projection position in which an image of an engaged slide can be projected to a dispensing position in which slide frames can be sequentially brought into alignment with the grabber. Once engaged by the grabber, a selected aligned slide frame can be extracted from the cassette and moved to the projection position.

24 Claims, 3 Drawing Sheets

SLIDE PROJECTOR

BACKGROUND

The present invention relates to a slide projector with an automatic slide changer.

Conventional slide projectors permit slides to be changed only in a sequential manner. One type of known slide changer has slides held abutting one another in a chute and are urged toward a dispensing position either by gravity or with spring force. A problem with such dispensers results from the friction between slides which frequently causes them to jam and resist being dispensed. In addition, there is no reliable means by which slides in such a feed arrangement can be randomly dispensed.

Another problem with known dispensers results from the large number of moving parts such as pivotal slide frame actuators. The reliability of such changers is generally inversely proportional to the number of such moving parts. In applications such as for projection of live theatre backdrops, the failure to properly dispense slide frames can be traumatic and has created a need for a reliable slide changer.

Moreover, in many applications such as for slide presentations to a live audience, there can be a substantial delay in having to sequentially run through slides in order to refer to a previously shown slide. The cycle time for a conventional slide projector for changing a slide is approximately 8 seconds.

Accordingly, it is an object of the present invention to provide a slide projector with an improved automatic slide changer.

It is a further object of the invention to provide a slide projector with an automatic slide changer capable of random selection of slides.

SUMMARY OF THE INVENTION

According to the invention there is provided a slide changer for a slide projector having a frame and a light source and lens assembly on the frame. A cassette for storing slide frames having a plurality of slide frame receptacles is also mounted on the frame and is reversibly movable. A slide frame grabber is mounted on the projector frame and is movable to a dispensing position adjacent the cassette. The cassette is movable so as to cause a selected slide frame from a plurality of slide frames located in the slide frame receptacles of the cassette to engage the slide frame grabber. Upon engagement of the grabber with a slide frame, the grabber moves the engaged slide frame to a projection position intermediate the light source and objective lens assembly.

Advantageously, the cassette is movable linearly and the frame grabber is movable in a direction perpendicular to the lens axis.

Preferably, a guide block is mounted on the projector frame. The guide block has a guide channel therein to receive protuberances on the slide frames and guide the slide frames successively into position into engagement with the frame grabber when the frame grabber is in a frame grabbing position.

Advantageously, cassette moving means are provided to move the cassette so as to position any one of the slide receptacles into a dispensing position so that a slide frame in the positioned slide receptacle may be engaged by the frame grabber. Thus, not only is sequential dispensing of slide frames possible but the ability to selectively position any one of the plurality of slide frame receptacles to the dispensing position allows for random dispensing of slide frames as well.

Preferably, the projector has a slide frame track along which the frame grabber travels and a lead screw threadedly engaged with a threaded hole in the frame grabber to reversibly drive the frame grabber in response to rotation of the lead screw.

The frame grabber is movable to a position proximate the cassette and the cassette is movable to bring a selected frame into engagement with the frame grabber, so that upon reversal of the frame grabber, the selected slide frame is dispensed from the cassette and moved into the projection position. The cassette is slidably engageable with a slide block and threadedly engaged with a threaded lead screw which reversibly drives the cassette along the slide block. A contact switch is positioned so that upon movement of the cassette to a start position the contact switch is switched by contact with the cassette to provide a reference signal. A controller is conditioned to control movement of the cassette and frame grabber in response to control signals from a control panel and a plurality of contact switches.

BRIEF DESCRIPTION OF THE DRAWINGS

The novel features believed characteristic of the invention are set forth in the appended claims. The invention itself, as well as other features and advantages thereof, will be best understood by reference to the description which follows read in conjunction with the accompanying drawings, wherein:

DETAILED DESCRIPTION WITH REFERENCE TO THE DRAWINGS

Figure 1:
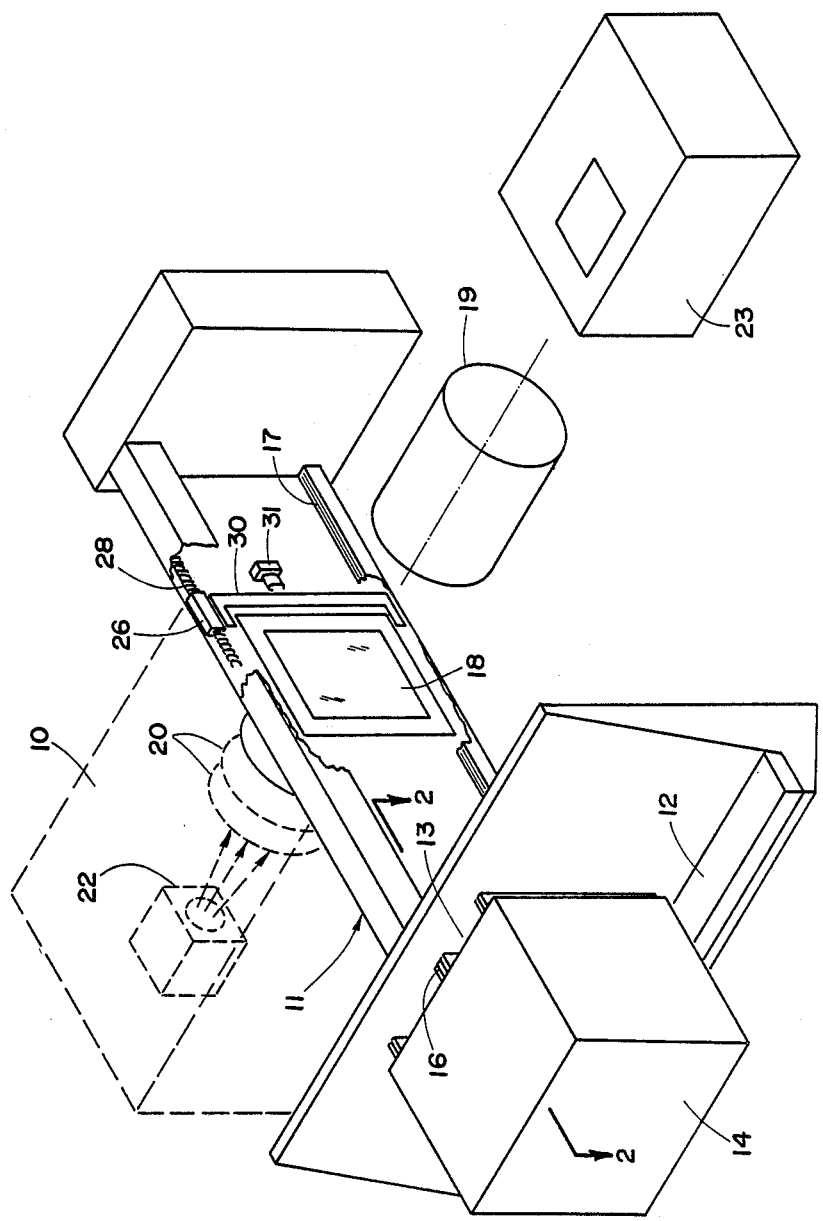
FIG. 1 is a perspective view of the slide projector showing principal elements of the automatic slide changer.

Referring to FIG. 1 there is shown a slide projector 10 having a mercury arc lamp 22, a condenser 20 axially aligned with the light source 22 and an automatic slide changer assembly 11. An objective lens 19 located on the other side of slide changer assembly 11 to lens 20 forms an image of slide 18 on a distant projection screen or surface (not shown). The slide changer assembly 11, which includes a cassette 14 for holding up to 32 slide frames 16, is movable linearly parallel to an axis of the lens assembly 20 and has an open side 17 facing towards the lens assembly 20. A slide grabber 30 is slidable over a track 17 in a direction perpendicular to an axis of the lens assembly 20 from a position as shown in which a slide frame 16 and slide 18 are positioned for image projection to a position in which the slide 18 and slide frame 16 are stored in the cassette 14. A threaded grabber block 26 engages with threads of a slide screw 28 and in response to rotation of the slide screw the block 26 and an attached frame grabber 30 travel reversibly along track 17. Electronics for the control of slide changer assembly 11 are housed in casing 23.

Figure 2:
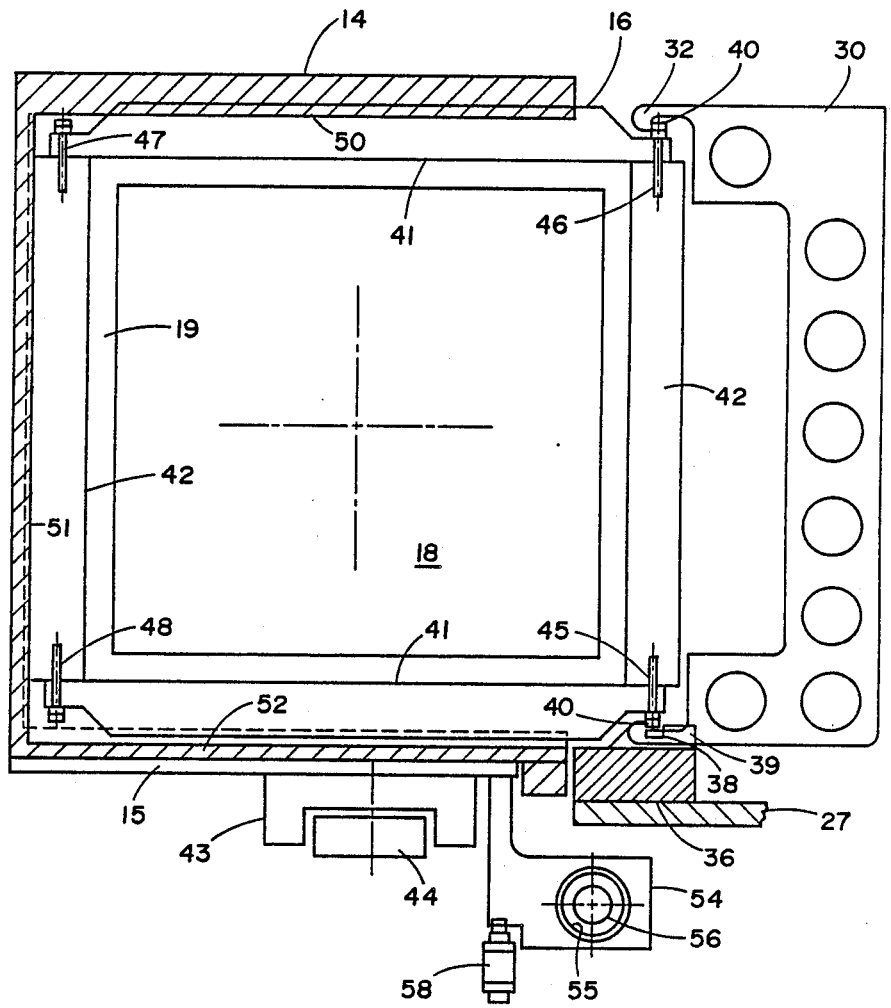
FIG. 2 is a sectional view taken along the line 2—2 of FIG. 1.

FIG. 2 shows the cassette 14 and a part of slide grabber 30. The interior of the cassette 14 has a plurality of spaced apart parallel grooves formed by sets of upper, lower and end partitions 50, 52 and 51, respectively. Each slide frame 16 is made up of two top elements 41 and two side elements 42 joined together by four screws 45, 46, 47 and 48 having protruding heads 40. A pair of glass sheets enclosing a film or a pair of flexible sheets one bearing a picture and enclosed in a metal sleeve 19 around the perimeter thereof are positioned in grooves (not shown) in the elements 41 and 42.

Cassette 14 is removably affixed to a mounting plate 15. A U-shaped block 43 is affixed to the underside of mounting plate 15 and slides over an elongated slide block 44. A lead screw block 54 also affixed to the underside of mounting plate 15 has a threaded hole 55 therethrough which threadedly engages an elongated lead screw 56. Rotation of lead screw 56 causes block 54 and, thus, the plate 15 and cassette 14, to move over slide block 44. A contact switch 58 is positioned to be contacted by block 54 upon movement of the cassette 14 back to a start position. Cassette 14 may be removed by moving it to the start position adjacent switch 58 and then removing it from mounting plate 15. A head portion of frame grabber 30 is shown with a pair of hooks or shoulders 32. Hooks 32 each engage the heads 40 of screws 45 and 46 of a slide frame 16.

Figure 3:
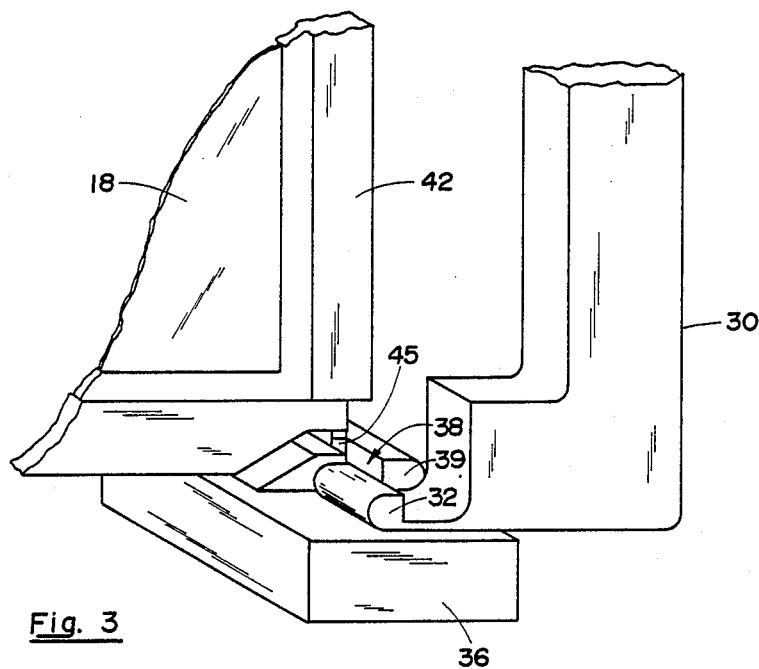
FIG. 3 is partial perspective view showing the cassette guide block, a portion of the cassette and slide frame and the frame grabber in a position to engage a slide frame.

Referring to FIG. 3 as well as to FIG. 2 a guide block 36 is affixed to the projector frame 27 having a raised portion 39 with an elongated channel 38 formed therein parallel to the direction of travel of the cassette 14. The projecting head 40 of a screw 45 used to fasten together parts forming each slide frame 16 enters the channel 38 as the cassette 14 is moved forwardly from its start position and constrains the head 40 so that upon exiting from channel 38 it abuts a shoulder 32 of frame grabber 30 both for screw 45 and for screw 46 at the top of the slide frame above screw 45. By stopping the cassette 14 at a selected position a selected cassette slide frame 16 is located such that its screw heads 40 abut hooks 32.

Figure 4:
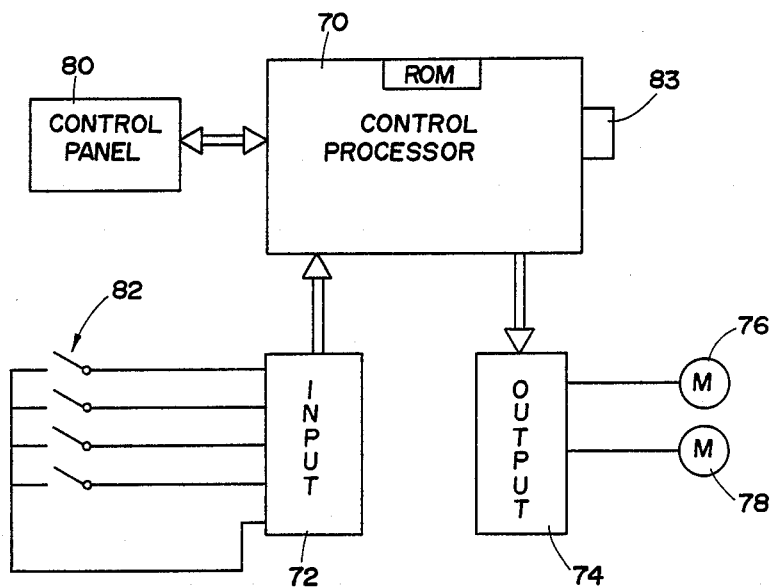
FIG. 4 is a block diagram of the electronic control system for the slide changer.

Referring to FIG. 4 there is shown a block diagram of the control electronics which consist of a processor 70 containing read only memory (ROM) in which is stored a control program, an input interface 72 for interfacing contact switches 82 with the processor 70 and an output interface 74 for interfacing the processor with drive motors 76 and 78 for driving the cassette 14 and frame grabber 30, respectively. A control panel 80 is also coupled to the control processor 70 for transmitting user control signals to and from the processor 70. An external port 82 is connected to the processor 70 for coupling thereto a cable leading to a remote control panel.

In operation, a number of slide frames 16 are stored in the receptacles of cassette 14 in locations which are recorded by a user. The cassette 14 is then caused to be moved to a start location in which contact switch 58 is actuated. Information is then provided by a user through control panel 80 or into port 82 from a remote control panel (not shown) as to which slide frame 16 is to be dispensed and moved into place for projection. Processor 70 issues control signals through output interface 74 to motor 78 which causes lead screw 28 to rotate and frame grabber 30 to move to a position adjacent raised portion 39 of guide block 36 such that hook 32 is aligned with a side of channel 38 nearest cassette 14. Processor 70 then issues another control signal which causes motor 78 to become activated and to drive lead screw 56 so that cassette 14 is moved to bring a desired slide frame into alignment with hooks 32. In this manner screw head 40 of screw 45 comes into a position in which it abuts lower hook 32 of frame grabber 30. Another control signal from processor 70 causes motor 78 to reverse and move the frame grabber 30 back until slide frame 16 is positioned intermediate lens assembly 20 and objective lens 19 such that an image of its slide 18 can be projected.

Upon receipt of a further user control signal, processor 70 activates motor 78 causing the frame grabber 30 to return the slide frame 16 into its associated receptacle in cassette 14. Cassette 14 can then be moved either to bring a next receptacle or any other desired receptacle into alignment with hooks 32 of frame grabber 30. The slide frame dispensing operation outlined above is then repeated.

Receptacle positioning of cassette 14 is achieved by use of contact switch 58. The point at which cassette 14 actuates switch 58 defines a reference position from which each slot or receptacle in cassette 14 is measured in terms of the number of revolutions of motor 76. A corresponding contact switch 31 is positioned to be actuated when frame grabber 30 reaches a projection position in which an image of slide 18 may be projected.

It will be appreciated that the slide frame engagement process involves no pivoting of moving parts and so is inherently reliable. Moreover, the use of separate slide frame receptacles to store and position slides combined with movement of the cassette 14 rather than the slides avoids any problems due to friction involved between slides as occurs in conventional slide changer mechanisms.

Although a cassette which moves linearly is the most convenient and simplest arrangement, obviously a carousel cassette may be employed with an arcuate guide channel for the screw heads. However, the number of slide frames a carousel arrangement would be able to store without occupying too large a diameter would be limited.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

I claim:

1. A slide changer for a slide projector, said projector having a projector frame and a light source and lens assembly mounted on said projector frame, comprising:

a cassette having a plurality of slide frame receptacles for receiving slide frames therein and movable so as to bring selected slide frames into a dispensing position;

a frame grabber for mounting on a projector so that it is movable from a projection position in which an image of an engaged slide can be projected to a dispensing position in which slide frames can be sequentially brought into alignment with said grabber and from which a selected aligned slide frame can be extracted from said cassette and moved to the projection position wherein said slide frame is brought into engagement with said frame grabber by movement of said cassette.

2. A slide changer according to claim 1, wherein said cassette is movable linearly and said frame grabber is movable in a direction perpendicular to a lens axis of said lens assembly.

3. A slide changer according to claim 1, including a guide block mounted on said projector frame, said guide block having a guide channel therein to receive protuberances on said slide frames and guide said slide frames successively into position into engagement with said frame grabber when said frame grabber is in a frame grabbing position.

4. A slide changer according to claim 2, wherein said frame grabber has a threaded opening threadedly engaged with threads of an elongated lead screw and in response to rotation of said lead screw said grabber is reversibly movable between a projection position and a frame grabbing position.

5. A slide changer according to claim 2, wherein said cassette has a block attached thereto with a threaded opening and including a cassette lead screw threadedly engaged with said block opening such that in response to rotation of said cassette lead screw said cassette is reversibly movable relative to said projector frame between a start and an end position.

6. A slide changer according to claim 5, wherein said cassette is removable from said cassette block.

7. A slide changer according to claim 5, including a contact switch positioned with respect to said projector frame so that said cassette block operates said switch when moved to a start position.

8. A slide projector having a projector frame and a light source and lens assembly mounted on said frame, comprising:
a cassette having a plurality of slide frame receptacles for receiving slide frames therein and movable so as to bring selected slide frames into a dispensing position;
a frame grabber mounted on said projector frame, movable in a direction perpendicular to the lens axis from a projection position in which an image of an engaged slide can be projected to a dispensing position in which slide frames can be sequentially brought into engagement with said grabber by movement of said cassette and from which a selected engaged slide frame can be extracted from said cassette and moved to the projection position.

9. A projector according to claim 8, wherein said cassette is movable linearly.

10. A projector according to claim 9, including a guide block mounted on said projector frame, said guide block having a guide channel therein to receive protuberances on said slide frames and guide said slide frames successively into position into engagement with said frame grabber when said frame grabber is in a frame grabbing position.

11. A projector according to claim 9, wherein said frame grabber has a threaded opening threadedly engaged with threads of an elongated lead screw and in response to rotation of said lead screw said grabber is reversibly movable between a projection position and a frame grabbing position.

12. A projector according to claim 9, wherein said cassette has a block attached thereto with a threaded opening and including a cassette lead screw mounted on said projector frame and threadedly engaged with said block opening such that in response to rotation of said cassette lead screw said cassette is reversibly movable between a start and end position.

13. A projector according to claim 11, including a motor coupled to said elongated lead screw for reversibly, rotatably driving said elongated lead screw.

14. A projector according to claim 12, including a motor coupled to said cassette lead screw for reversibly, rotatably driving said cassette lead screw.

15. A projector according to claim 1, including a contact switch mounted on said projector frame and positioned so that said cassette block operates said switch when moved to a start position.

16. A projector according to claim 13, including a linear slide mounted on said frame below said cassette parallel to said leadscrew and a cassette guide mounted on an underside of said cassette slidably engageable with said cassette slide.

17. A projector according to claim 9, including contact switches for switching in response to movement of said cassette and frame grabber to predetermined positions, a frame drive motor coupled to said frame grabber for reversibly driving said grabber from a projection position to a frame grabbing position, a cassette drive motor coupled to said cassette for reversibly driving said cassette, a processor, an output interface circuit coupled between said processor and said frame and cassette drive motors, and an input interface circuit coupled to said processor and to said contact switches.

18. A projector according to claim 17, including a control panel coupled to said processor for providing control signals to said processor so as to operate said drive motors in a selected manner so as to move a selected one of said slide frames from said cassette to the projection position or out of the projection position into a corresponding slide receptacle of said cassette.

19. A projector according to claim 17, including a control port on said processor for conducting control and data signals between said processor and a remote control panel.

20. A slide projector having a projector frame and a light source and lens assembly mounted on said frame, comprising:
a cassette having a plurality of slide frame receptacles for receiving slide frames therein and linearly movable so as to bring selected slide frames into a dispensing position;
a frame grabber mounted on said projector frame, movable in a direction perpendicular to the lens axis from a projection position in which an image of an engaged slide can be projected to a dispensing position in which slide frames can be sequentially brought into alignment with said grabber while said grabber is in a fixed frame receiving position and from which a selected aligned slide frame can be extracted from said cassette and moved to the projection position;
cassette motor means for reversibly moving said cassette to a selected position;
frame grabber motor means for reversibly moving said frame grabber; and
means for guiding said slide frames into engagement with said frame grabber one after another as said cassette is moved forwardly away from said start position.

21. A projector according to claim 20, including a plurality of slide frames reversibly insertable into said slide frame receptacles, each of said slide frames including a pair of opposed projections on an end thereof and said frame grabber has a pair of opposed hooks for engaging said opposed projections.

22. A method of dispensing slide frames stored in a movable cassette comprising:
   moving a slide frame grabber having a pair of slide frame engaging elements into a dispensing position juxtaposed to associated receiving elements on said slide frame for receiving said engaging elements;
   moving said cassette so that a selected slide frame is engaged with said frame grabber engaging elements;
   moving said slide frame grabber and engaged slide frame back to a projection position in which an image of a slide contained in said slide frame is projected.

23. A method according to claim 22, including moving said cassette linearly.

24. A method according to claim 22, including moving said slide frame linearly perpendicular to an axis of projection of said projector.

* * * * *